Jan. 5, 1926. 1,568,476

C. SENSSENBRENNER

AMMONIA ABSORPTION REFRIGERATOR

Filed Dec. 16, 1924

Witnesses

Inventor
Carl Senssenbrenner

Patented Jan. 5, 1926.

1,568,476

UNITED STATES PATENT OFFICE.

CARL SENSSENBRENNER, OF DUSSELDORF-OBERKASSEL, GERMANY.

AMMONIA-ABSORPTION REFRIGERATOR.

Application filed December 16, 1924. Serial No. 756,309.

*To all whom it may concern:*

Be it known that I, CARL SENSSENBRENNER, a citizen of the German Republic, and resident of Dusseldorf-Oberkassel, in the Republic of Germany, have invented a new and useful Improved Ammonia-Absorption Refrigerator, of which the following is a specification.

The present invention relates to an ammonia absorption refrigerator of the kind which comprises two closed vessels interconnected by a conduit, of which vessels one is adapted to contain a solution of ammonia and to serve alternately as a generator and an absorber and the other to serve alternately as a condenser and an evaporator.

In apparatus of the kind referred to, it is essential, when the first mentioned vessel is acting as an absorber, that the ammonia gas flowing into that vessel be conducted into the solution in order to be completely absorbed. If merely conducted to the space above this solution, the ammonia forms at the top surface of the solution a saturated layer which is lighter in specific weight than the non-saturated solution and prevents the continuation of the absorption, in consequence of which the freezing process prematurely stops. Conducting the ammonia into the solution by means of valves, entails the great danger, that such valves in time work loose, and experiments have proved that the least looseness suffices to prevent the absorption. In order, therefore, to avoid the use of valves and special communicating conduits, it has been proposed to provide an inverted bell adapted to rise and fall within the vessel. With such arrangements a disadvantage arises owing to the fact that heating of the ammonia solution in the vessel while same is acting as a generator produces frequently light gases which are insoluble in water. If these gases remain and collect in the bell, they prevent ultimately the sucking action of the bell and in consequence thereof they prevent the adsorption.

According to the present invention the disadvantage just mentioned is eliminated, and complete absorption assured when the vessel is acting as an absorber, by providing within the bell a pipe open at the top and bottom, so floated that its open end is located below the top of the bell when the latter is raised and is closed by the said top when the bell falls.

The annexed drawings illustrate two forms of construction, and in said drawings, Fig. 1 is a vertical section of one construction of generator and absorber under the conditions obtaining during the generating period;

Figure 1:
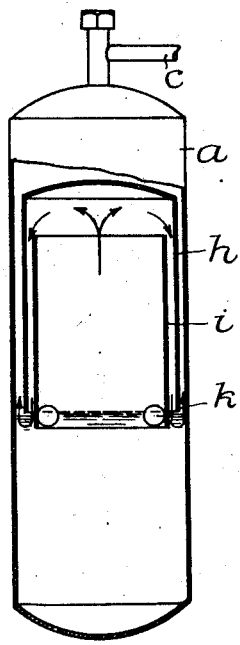
Figure 2:
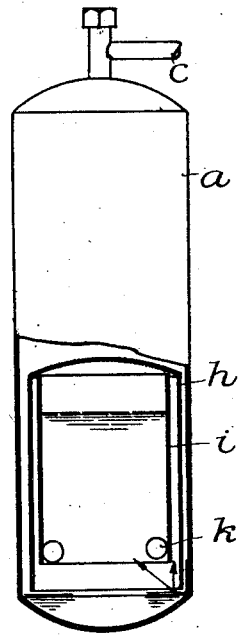
Fig. 2 is a view similar to Figure 1 but showing the vessel acting as an absorber.

The closed vessel which serves alternately as generator and absorber has been denoted by the reference letter $a$, and according to the construction shown in Figs. 1 and 2, a movable pipe $i$ open at the top and bottom is housed within a bell $h$, which pipe is forced upwardly by means of floats $k$.

When during generating (Fig. 1) the bell $h$ is raised, the ammonia gas developed cannot simply leave the bell around the lower edge thereof, but is forced to take a course leading below the top surface of the bell and between the bell and pipe $i$ as indicated by arrows in Fig. 1. In pursuing this course, the ammonia gases force any light unsoluble gases present in the bell $h$ to leave the bell and to pass to the upper space of the vessel $a$.

When during absorption the bell $h$ sinks, the floats $k$ force the pipe $i$ upwardly inside the bell until stopped by the top of the latter, as shown in Fig. 2. The pipe $i$ being then entirely contained within the bell $h$, the ammonia reaches the solution in the bell and in the pipe $i$ by passing around the lower edge of the bell, so that it is completely absorbed.

Figure 3:
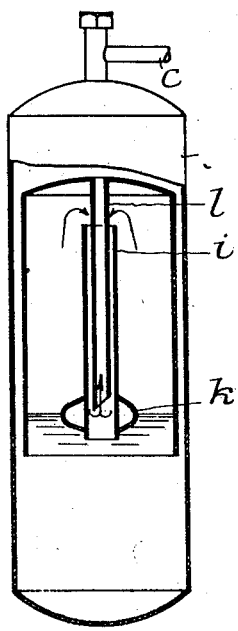
Figs. 3 and 4 are views respectively similar to Figs. 1 and 2 showing a modified construction of the generator and absorber.
Figure 4:
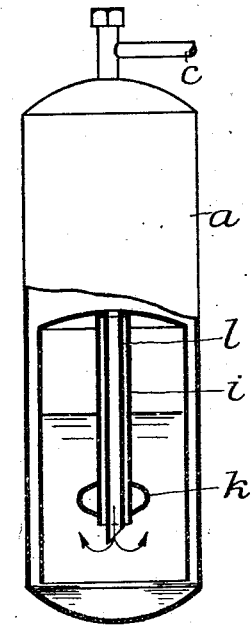

The modified construction shown in Figs. 3 and 4 serves the same purpose as the construction just described. The top of the bell $h$ carries a pipe $l$ open at the top and bottom, which pipe is shorter than the shell of the bell. The gases do not enter the bell $h$ by passing around the lower edge thereof, as is the case in the before-described construction, but they enter and leave the bell by way of the pipe $l$. A second pipe $i$ open at the top and bottom and provided with floats $k$, analogous to the pipe $i$ described with reference to Figs. 1 and 2, loosely encircles the pipe $l$. The action of this pipe $i$ is similar to the action of the pipe $i$ in the before-described example and therefore needs not to be reiterated.

I wish it to be distinctly understood, that I do not limit myself to the precise construction shown seeing that various modifications may be carried out in the adaptation of my improved refrigerator to the several kinds of application and I therefore reserve the right to all such modifications as properly fall within the scope of the following claims.

What I do claim as my invention and desire to secure by Letters Patent is:—

1. In an ammonia-absorption refrigerator, the combination with a vessel adapted to contain a solution of ammonia and to serve alternately as a generator and an absorber, and a bell adapted to rise and fall within the vessel, of a pipe open at both ends and shorter than the bell, and means adapted to support said pipe vertically within the bell.

2. In an ammonia-absorption refrigerator, the combination with a vessel adapted to contain a solution of ammonia and to serve alternately as a generator and an absorber, and a bell adapted to rise and fall within the vessel, of a pipe open at both ends and shorter than the bell, and floats adapted to support said pipe vertically within the bell in different positions, determined by the rise and fall of the latter, in one of which positions the upper end of the pipe is closed by the top of the bell.

3. In an ammonia-absorption refrigerator, the combination with a vessel adapted to contain a solution of ammonia and to serve alternately as a generator and an absorber, and a bell adapted to rise and fall within the vessel of a pipe depending from and opening through the top of said bell, a movable pipe open at both ends and surrounding the depending pipe, and means adapted to support the movable pipe in different vertical positions determined by the rise and fall of the bell.

4. In an ammonia-absorption refrigerator, the combination with a vessel adapted to contain a solution of ammonia and to serve alternately as a generator, and an absorber, and a bell adapted to rise and fall within the vessel, of a pipe depending from and opening through the top of said bell, a movable pipe open at both ends and surrounding the depending pipe, and floats adapted to support the movable pipe in different vertical positions determined by the rise and fall of the bell in one of which positions the upper end of the movable pipe is closed by the top of the bell.

In witness whereof I have hereunto signed by name this 18th day of November 1924.

CARL SENSSENBRENNER.